(No Model.) 3 Sheets—Sheet 1.
S. C. SCHOFIELD.
CORN SHELLER.
No. 318,041. Patented May 19, 1885.
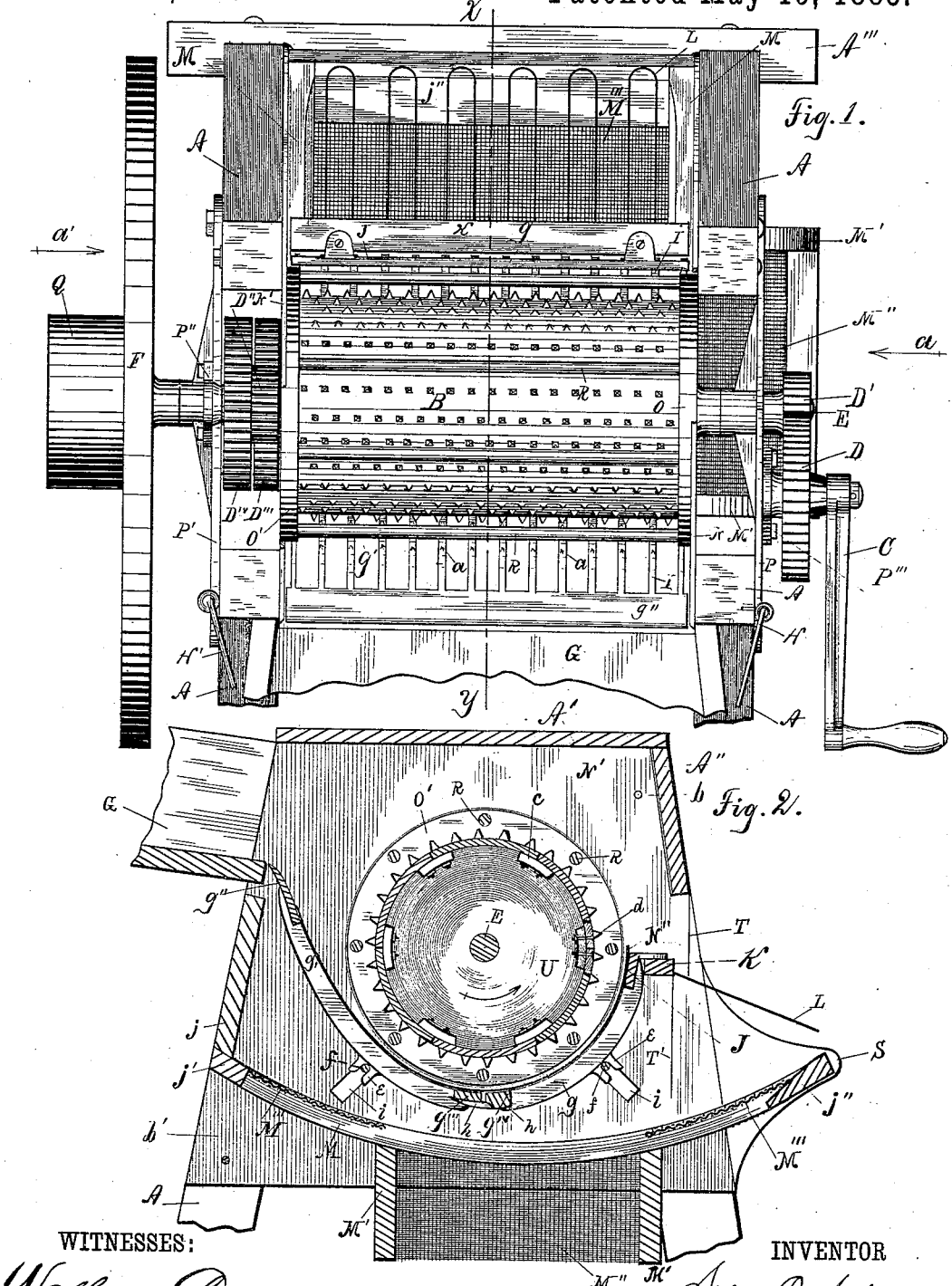
WITNESSES:
Wallace Greene
F. V. Brainerd
INVENTOR
Silas C. Schofield
BY
Robt. H. Wiles
ATTORNEY (No Model.)  3 Sheets—Sheet 2.

S. C. SCHOFIELD.
CORN SHELLER.

No. 318,041. Patented May 19, 1885.

WITNESSES:
Wallace Greene
F. W. Brainerd

INVENTOR
Silas C. Schofield
BY Robt H Wiles
ATTORNEY (No Model.)
S. C. SCHOFIELD.
CORN SHELLER.
No. 318,041. Patented May 19, 1885.
3 Sheets—Sheet 3.
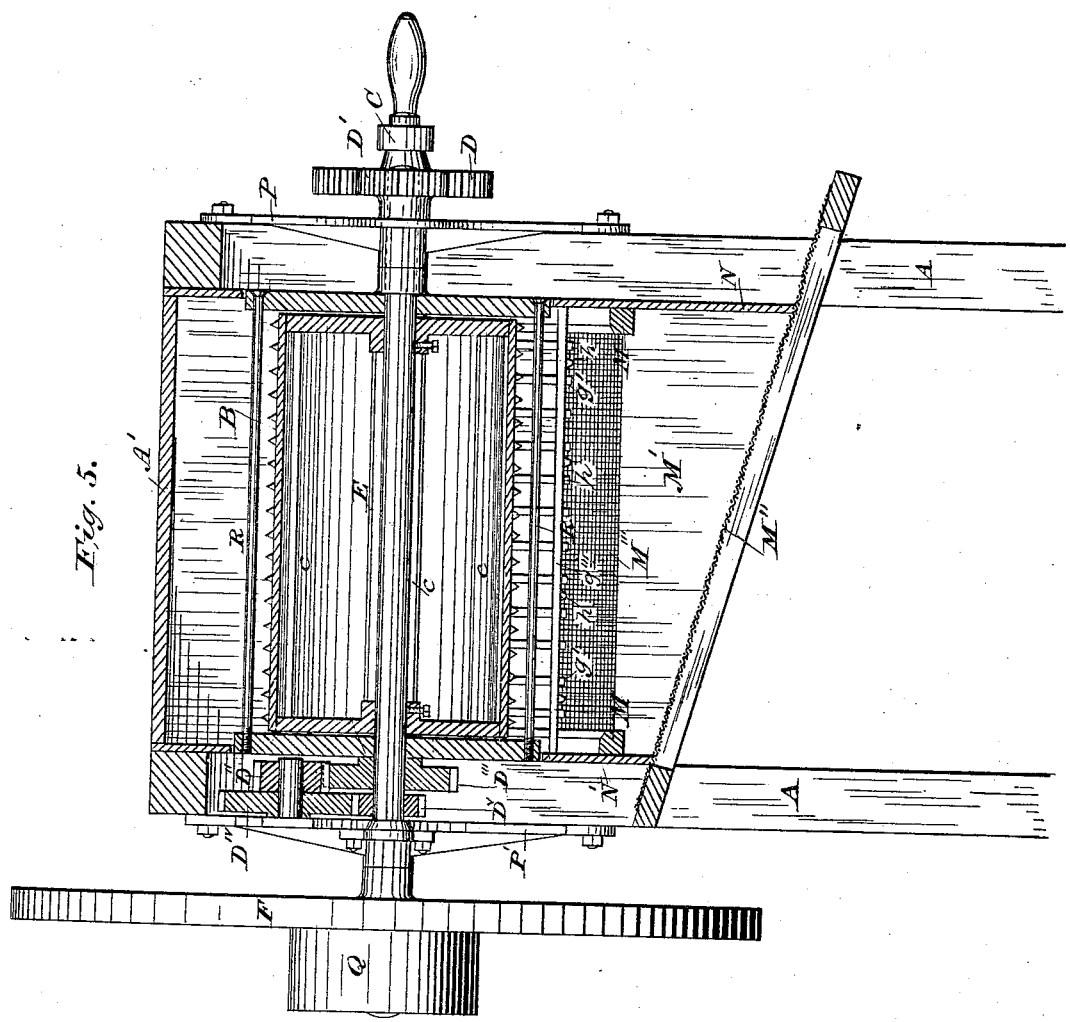
Witnesses:
T. C. Brecht
G. L. De Motte
Inventor:
Silas C. Schofield
By
Robt. H. Miles, Attorney.

UNITED STATES PATENT OFFICE.

SILAS C. SCHOFIELD, OF FREEPORT, ILLINOIS.

CORN-SHELLER.

SPECIFICATION forming part of Letters Patent No. 318,041, dated May 19, 1885.

Application filed April 14, 1884. (No model.)

*To all whom it may concern:*

Be it known that I, SILAS C. SCHOFIELD, a resident of Freeport, in the county of Stephenson and State of Illinois, have invented certain new and useful Improvements in Corn-Shellers; and I do hereby declare the following to be a full, clear, and exact description of the invention, such as will enable others skilled in the art to which it pertains to make and use the same.

My invention is a new and improved corn-sheller, so constructed that the ears of corn which it shells are passed between the outer surface of a toothed shelling-cylinder and the inner surface of a series of spring-actuated fingers, which form a concave practically concentric with the shelling-cylinder, the ears being guided through the space between the cylinder and concave by a series of rods or bars forming a cage, and the rates of rotation of the cage and shelling-cylinder being sufficiently different to allow the shelling-teeth to act on the ears as they are fed forward. The construction of the sheller is shown and described in the following specification, and shown in the accompanying drawings, in which—

Figure 3:
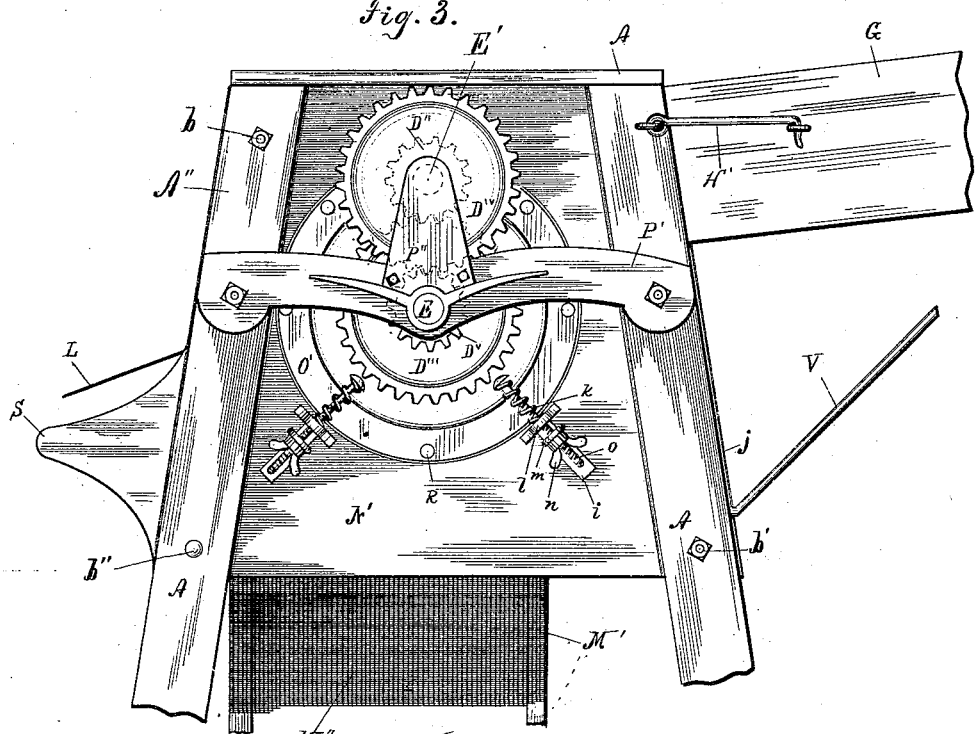
Figure 4:
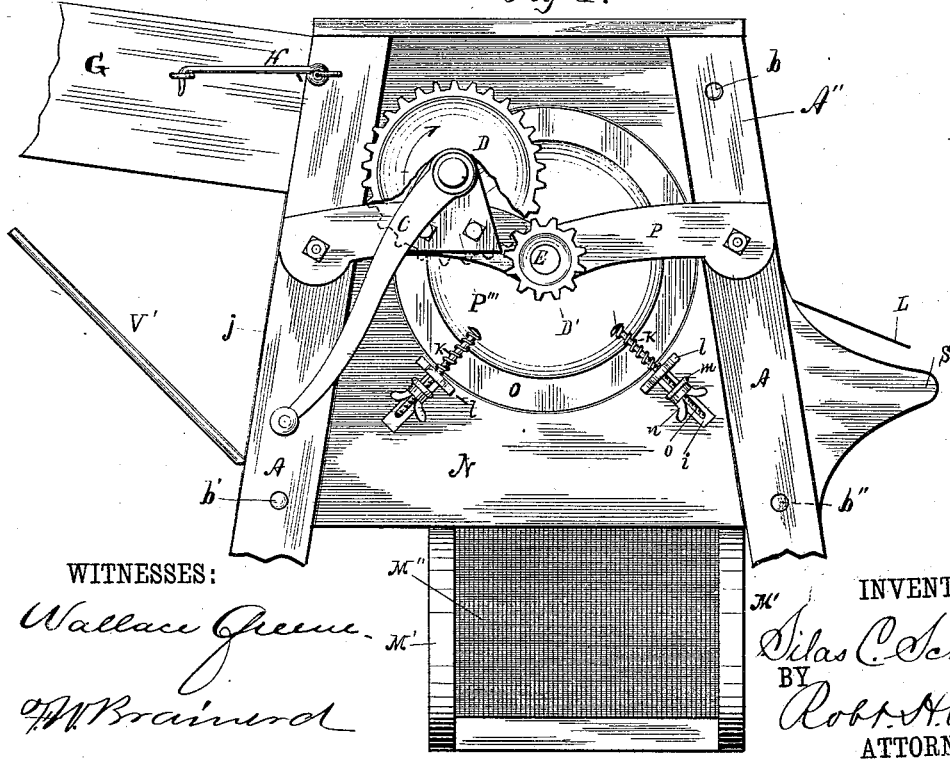

Figure 1 is a plan of the sheller, the top or cover being removed; Fig. 2, a central vertical section of the same, looking in the direction indicated by the arrow $a$, Fig. 1, the plane of section passing through the line $x\,y$, Fig. 1; Fig. 3, an end elevation looking in the direction indicated by the arrow $a'$, Fig. 1; Fig. 4, an end elevation looking in the direction indicated by the arrow $a$, Fig. 1, and Fig. 5 a vertical section of the sheller, the plane of section passing through the axis of the shelling-cylinder.

In these views A A A A are four legs supporting the machine, the two legs at each side of the sheller being joined at the bottom by a base-plate, A''', Fig. 1, which rests on the floor or ground. The legs at one end of the sheller are connected by an iron end plate, N, bolted to their inner faces, and a similarly-attached end plate, N', connects the two legs at the other end of the sheller. A cover, A', rests on the top of the sheller and covers the shelling mechanism, and a leaf, A'', attached to the rear edge of the cover, extends downward between the inner faces of the end plates, N N', which are slightly recessed to receive the leaf. (See section, Fig. 2.) The front side of the machine is partly closed by a board, $j$, Figs. 2, 3, 4, which also lies between the end plates, N N', and is secured in the same way as the leaf A''. Two long bolts, $b\,b'$, connect the end plates, the position of said bolts being shown in Figs. 2, 3, and 4. Suitable nuts on these bolts draw the end plates toward each other, and the leaf A'' and board $j$, butting against the inner faces of the end plates and resisting the inward pressure thereof, give great rigidity to the frame, which is at the same time extremely simple and easy to put together or take apart.

On the outer faces of the legs A A, at opposite ends of the sheller, are bolted two stationary bearing-plates, P P', in which are journaled the ends of the shaft E of the shelling-cylinder B, the shelling-cylinder consisting of two circular-heads, U, (shown in Fig. 2 and in Fig. 5,) and a series of externally-toothed plates bolted to the heads and forming a cylindrical shell thereon. The heads U are rigidly fastened to the shaft E, and turn with it, and the shaft is provided at one end with a pinion, D', which engages with a larger pinion, D, provided with a crank, C, by means of which it is turned. On the other end of the shaft E is mounted a fly-wheel, F, and outside the fly-wheel is a pulley, Q, by means of which power may be applied to the sheller through a belt. The pinion D turns in the direction indicated by the arrow on its face in Fig. 4, and the pinion D', shaft E, and cylinder B turn in the direction indicated by the arrow on the head U in Fig. 2.

On the opposite end of the shaft E from the pinion D' is mounted a similar pinion, D$^v$, which engages with a pinion, D$^{iv}$, of greater diameter. A small pinion, D'', is fastened to or formed integrally with the pinion D$^{iv}$, and the two pinions so joined are concentric, and are mounted on a short shaft, E', on the inner face of the bearing P'', which is bolted to the bearing-plate P', Fig. 3. The small pinion D'' is fastened to the inner face of the pinion D$^{iv}$ and engages with a large pinion, D''', which is concentric with and is fastened to the outer face of a circular plate, O', which is one of the heads of a cylindrical feeding-cage, heretofore referred to. The head O' and a corresponding head, O, at the opposite end of the cage, are loosely mounted and turn freely on the shaft E, and they are connected by a series of parallel rods, R, securely fastened to the heads and separated by spaces greater than the greatest diameter of any ear of corn to be passed through the sheller. It is evident from the arrangement of the gears $D^v\ D^{iv}\ D''\ D'''$ that the last-named pinion and the head O', to which it is attached, turn in the same direction as the shelling-cylinder B, but at a much slower rate of speed, and that since the heads O O' are rigidly connected by the rods R the motion of the entire cage is the same as that of the head O'.

Instead of transmitting the motion of the head O' to the head O through the rods R, the pinion D' may be connected with the head O by a system of gears the same as that which connects the pinion $D^v$ with the head O', and the rods R will thus be relieved of all torsional strain.

On the front side of the sheller is fastened a trough, G, of any desired form and size, and held in place by the hooks H H'. Ears of corn placed in this trough pass from it onto a series of parallel fingers, $g'$, and thence onto a second series of fingers, $g$, being guided forward by the rods R of the cage, between which they are caught as they roll down the inclined surface of the fingers $g'$. The fingers $g'$ are connected at the top by a cross-bar, $g''$, and at the bottom by a second cross-bar, $g'''$, and form a single rigid frame or concave, while the fingers $g$ are connected by two cross-bars, $g^{iv}$ J, and form a second concave. The cross-bar $g^{iv}$ is provided with a series of projections, $h$, which support the cross-bar $g'''$ without, however, being fastened thereto; and the cross-bar J is fastened to a bar, K, extending from end to end of the sheller, but not connected with the end plates, N N', the entire concave $g\ g^{iv}$ J K being held in position by the rod $f$, as is hereinafter set forth. The connection of the concaves $g\ g'$ is such that the former may be pressed outward from the shelling-cylinder without affecting the latter; but if the concave $g'$ be pressed away from the cylinder it carries with it the lower end of the concave $g$. The two concaves $g'\ g$ are pressed inward against the cylinder B by rods $f\ f$, resting in suitable retaining-notches, $e\ e$, in the outer faces of the concaves, and moving in slots $i\ i$ in the end plates, N N', of the sheller.

On the outer faces of the end plates, N N', are fastened, immediately above the slots $i\ i$, a series of bearings, $l\ l$, through which slide-headed bolts $o\ o$, Figs. 3, 4, each of said bolts being pushed upward (or rather pushed toward the axis of the cylinder B) by a spring, $k$, interposed between the head of the bolt and the bearing through which the bolt slides. Below the bearings $l$ the bolts $o$ pass through eyes $m$, formed integrally with the rods $f$, at their outer ends, and immediately below each of the eyes $m$ is a wing-nut, $n$, which serves to press the rod $f$ inward toward the shelling-cylinder and increase the tension of the spring $k$.

It is evident that any outward pressure against the concaves $g'\ g$ is resisted by the springs $k$, and that the latter press the concaves inward toward the cylinder B and against any ears of corn which may pass between the cylinder and the concaves. The outward motion of the concaves $g'\ g$ is only limited by the tension of the springs $k\ k$. The limit of their motion toward the shaft E is fixed by flanges N'' on the inner faces of the end plates, N N', and immediately outside of the circular openings in said end plates in which the heads O O' rotate. The ends of the bars $g''\ g'''\ g^{iv}$ J, when pressed inward sufficiently by the bars $f$ and springs $k$, strike the flanges N'', and are thus prevented from striking the bars of the cage. (See Fig. 2, in which the flange attached to the head N' is shown.)

Below the shelling-cylinder and the feeding-cage is a frame consisting of two curved bars, M M, fastened to the end plates, N N', respectively, and two cross-bars, $j'\ j''$, connecting the ends of the bars M M. (See Figs. 1, 2.) Immediately below the frame is an inclined discharge-trough extending from end to end of the sheller, and having side board, M', and a screen bottom, M''. This discharge-trough lies directly under the shelling-cylinder, its higher end being next to the end plate, N', and its lower end just outside of the end plate, N. (See Figs. 1 and 5.) Wire-netting M'''' (see Figs. 1 and 2) is stretched between the bars $j'\ j''$ and the edges of the discharge-trough M' M', and forms a sieve, through which fine particles of all kinds drop, leaving the corn to fall into the discharge-trough. An apron formed of inclined parallel wires L, Figs. 1, 2, is fastened to the bar K and serves as a discharge incline for cobs, and at the same time permits the corn to drop through it onto the screen-bottom M'''; and two curtains, T T', attached to the leaf A'' and the bar K, respectively, prevent shelled grain from being thrown out of the sheller as it leaves the shelling-cylinder.

The operation of the sheller is evident. Ear-corn placed in the trough G passes down the concave $g'$, and is caught between the bars R of the feeding-cage and between the teeth of the shelling-cylinder and the concave. The tendency of the cylinder is to roll the ear down the inclined concave $g'$ and up the opposite concave, $g$; and were the cylinder and concaves the only elements acting on the ears they would simply roll through the machine and down the inclined apron L without being shelled. They are, however, retarded in their progress by the bars R, which move much slower than the shelling-cylinder, and being so retarded they are subjected to the shelling as well as the rotating action of the teeth of the cylinder. After being shelled the cobs pass out over the bar K and pass down the apron L, and the shelled corn as fast as it is taken from the ear falls on the screens M''' or into the trough M', and, after being cleaned by passing over the screen-surfaces, passes downward to the mouth of the trough, and is fully discharged from the sheller.

Having now described my invention and explained its operation, what I claim as new, and desire to secure by Letters Patent, is—

1. The combination of the shelling-cylinder B, concaves $g'$ $g$, connected by the bars $g'''$ $g^{iv}$ and projections $h$, substantially as described and shown, rods $f$, and springs $k$, pressing said concaves inward toward the shelling-cylinder, the heads O O', and rods R, forming a cage concentric with the cylinder B, but outside thereof, and means for rotating said shelling-cylinder and for rotating said cage in the same direction as the shelling-cylinder, but at a slower rate of speed.

2. The combination of the shelling-cylinder B, the concaves $g'$ $g$, rods $f$, and rings $m$, formed integrally therewith, bolts $o$, bearings $l$, springs $k$, and nuts $n$, combined and operating substantially as set forth, whereby the ends of said concaves are independently adjustable with reference to the surface of the shelling-cylinder.

3. The combination of the feeding and shelling mechanism shown and described, the frame M M' $j'$ $j''$, partial screen-bottom M''', and screen-bottomed discharge-spout M', substantially as shown and described, and for the purpose set forth.

4. The combination of the feeding and shelling mechanism shown and described, a screen-bottom having a central opening extending from end to end of the sheller and beneath the shelling-cylinder, and a screen-bottomed discharge-spout lying beneath said opening and adapted to clean as well as discharge the shelled grain, substantially as shown and described, and for the purpose set forth.

In testimony whereof I have signed this specification in the presence of two subscribing witnesses.

SILAS C. SCHOFIELD.

Witnesses:
J. H. STEARNS,
F. W. BRAINARD.